(12) United States Patent
Hall

(10) Patent No.: US 6,244,355 B1
(45) Date of Patent: Jun. 12, 2001

(54) ISOLATION MOUNT

(76) Inventor: Ronald H. Hall, 168 Argyle Street, Embro (CA), N0J 1J0

(*) Notice: Subject to any disclaimer, the term of this patent is extended or adjusted under 35 U.S.C. 154(b) by 0 days.

(21) Appl. No.: 09/450,786

(22) Filed: Nov. 30, 1999

(51) Int. Cl.$^7$ ................................. E02F 5/10; A01B 3/64
(52) U.S. Cl. ............................................. 172/40; 405/182
(58) Field of Search ................................ 172/40, 56, 272, 172/554, 699, 165, 667, 735; 405/174, 180–183

(56) References Cited

U.S. PATENT DOCUMENTS

| | | |
|---|---|---|
| 3,746,100 | 7/1973 | Hall et al. . |
| 4,140,425 | 2/1979 | Flippin . |
| 4,164,982 | 8/1979 | Draney . |
| 4,867,607 | 9/1989 | Johnson et al. . |
| 5,482,121 | 1/1996 | Draney et al. . |
| 5,526,590 | 6/1996 | Palm et al. . |

Primary Examiner—Robert E. Pezzuto
(74) Attorney, Agent, or Firm—R. Craig Armstrong

(57) ABSTRACT

An isolation mount having a first mounting surface arranged on a vehicle. The first surface has substantially vertical first mounting lugs arranged at a lower end of the first surface, and a first fastening device for holding at least one pair of resilient device. The resilient devices comprise first resilient portions and second resilient portions. The first fastening device is preferably arranged at a top end of the first surface. The isolation mount further has a pivoting device, which has a first side facing the first surface, a second side facing away from the first surface and substantially vertical second mounting lugs arranged at a lower end of the first side of the pivoting device. The second mounting lugs are attachable to the first mounting lugs via pins to form a first hinge, about which the pivoting device is pivotable. The pivoting device further has resilient device holding device arranged at a top end of the pivoting device. The first resilient portions are arranged between the first side of the pivoting device and the first mounting surface whilst the second resilient portions are arranged on the second side of the pivoting device being pressed against the second side by a fourth resilient device holding device. The pivoting device is thus held between the first resilient portions and the second resilient portions at the top end of the pivoting device. The pivoting device is further fastened to a vibrating tool attachably mounted to the pivoting device via a second fastening device.

10 Claims, 6 Drawing Sheets

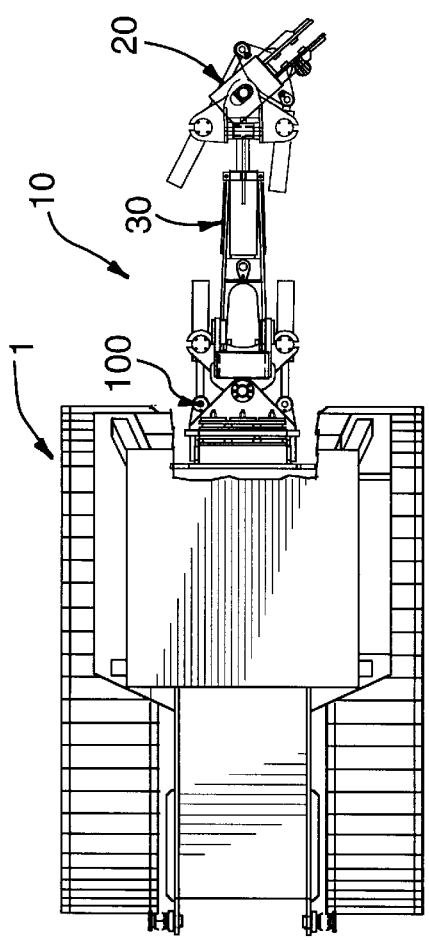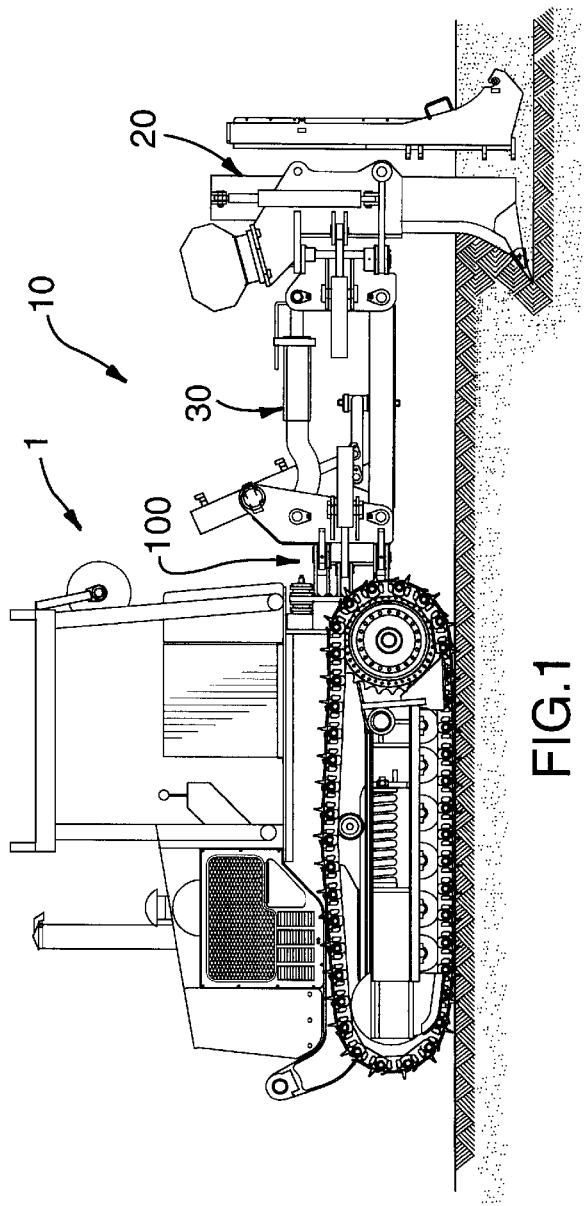
FIG.2
FIG.1

ISOLATION MOUNT

BACKGROUND OF THE INVENTION

1. Field of the Invention

The invention relates to a mount for reducing vibrations transmitted from a tool to a carrier vehicle, such as a tractor. More specifically, the mount isolates a tractor from the vibrations of a vibratory plow, or similar tool.

2. Description of the Prior Art

In the past, different approaches have been tried to minimize the transfer of vibrations from a tool to a carrier vehicle, such as a tractor. The vibrations generally tire out the tractor operator and cause the bolted parts of the tractor to come apart, necessitating re-tightening of these bolts. The wear on the tractor parts also increases. The vibrating tool, for example a plow, is generally mounted on a sub-frame having a vibrating means attached to the sub-frame. The sub-frame is held by vibration dampening means in a larger frame. Examples of this construction are shown in U.S. Pat. No. 5,526,590 (Palm et al.), U.S. Pat. No. 5,482,121 (Draney et al.), U.S. Pat. No. 3,746,100 (Hall et al.), U.S. Pat. No. 4,140,425 (Flippin) and U.S. Pat. No. 4,164,982 (Draney). These solutions all share the apparent disadvantage of excessive wear and tear on the vibration dampening means, due to the fact that the sub-frame is vibrating in all directions. This subjects the vibration dampening means to compression (tensile) and shear stress. Most vibration means are rubber pads (or similar material), and inherently much less suited to shear stress, as compared to tensile stress. The vibration dampening means therefor wear out excessively fast in these applications. Also, the efficiency of vibration damping is not high enough to properly dampen vibrations from reaching the tractor.

A further attempt to provide a vibratory plow construction with vibration dampening means is disclosed in U.S. Pat. No. 4,867,607 (Johnson et al.). This document discloses a pivotable part of the vibratory plow carrying frame. The frame elements are separated by air cushions (or resilient dampening means of other types), arranged to dampen vertical movement of the frame parts. This construction necessitates the use of extra frame parts, to achieve the pivoting of the frame, thus adding weight, complexity and cost to the construction. If solid rubber vibration dampers are used, they are objected to shear stress, which is detrimental to the life of such dampers.

SUMMARY OF THE INVENTION

It is an object of the invention to provide an improved vibration isolation mount, that prevents the action of shear stress on the vibration dampening means, while the mount successfully isolates a substantial portion of the vibrations generated by a tool attached to a tractor, whilst providing a high load capacity for the isolation mount.

In the invention, an isolation mount comprises a first mounting surface arranged on a vehicle. The first surface has substantially vertical first mounting lugs arranged at a lower end of the first surface, and a first fastening means for holding at least one pair of resilient means. The resilient means comprise first resilient means and second resilient means. The first fastening means is preferably arranged at a top end of the first surface. The isolation mount further has a pivoting means, which has a first side facing the first surface, a second side facing away from the first surface and substantially vertical second mounting lugs arranged at a lower end of the first side of the pivoting means. The second mounting lugs are attachable to the first mounting lugs via pins to form a first hinge, about which the pivoting means is pivotable. The pivoting means further has resilient means holding means arranged at a top end of the pivoting means. The first resilient means are arranged between the first side of the pivoting means and the first mounting surface whilst the second resilient means are arranged on the second side of the pivoting means being pressed against the second side by fourth resilient means holding means. The pivoting means is thus held between the first resilient means and the second resilient means at the top end of the pivoting means. The pivoting means is further fastened to a vibrating tool attachably mounted to the pivoting means via second fastening means.

The first fastening means preferably comprise one bolt and nut per pair of resilient means. The bolts cooperate with first bolt holes arranged in the first surface, second bolt holes arranged in the first fastening means, third bolt holes arranged in the first resilient means, fourth bolt holes arranged in the second resilient means, fifth bolt holes arranged in the pivoting means and sixth bolt holes arranged in the fourth resilient means holding means. The bolts are insertable from behind the first surface through the first bolt hole, with the bolt head preventing the bolt from going completely through the first bolt hole, through the second bolt hole of the first fastening means, through the third bolt holes of the first resilient means, through the fourth bolt holes of the second resilient means, through the fifth bolt holes of the pivoting means and through the sixth bolt holes of the fourth resilient means holding means. The nuts are arranged to screw onto threads on the bolts to securely hold the first resilient means, the pivoting means, the second resilient means and the fourth resilient means holding means onto the bolts.

The second fastening means preferably comprise substantially horizontal third mounting lugs, which cooperate, via second pins, with substantially horizontal fourth mounting lugs arranged on the vibrating tool, to form second hinges.

The fastening means further preferably comprises expansion limiting means arranged around the first and second resilient means, to physically limit the expansion of the pairs of resilient means during compression of the same.

The isolation mount preferably comprises three pairs of resilient means and three fastening means, although the actual number of pairs is dependent upon the application properties, such as available space and expected force to withstand for the mount.

The mount is preferably mounted on a tractor, which has a vibratory plow arrangement, or any other vibrating tool, held by a frame.

BRIEF DESCRIPTION OF THE DRAWINGS

In order that the invention may be more clearly understood, the preferred embodiment thereof will now be described in detail by way of example, with reference to the accompanying drawings, in which:

FIG. 1 is an elevational side view of a tractor having a plow arrangement attached to its end, FIG. 2 is a top view of the tractor according to FIG. 1.

DETAILED DESCRIPTION OF THE INVENTION

Figure 3:
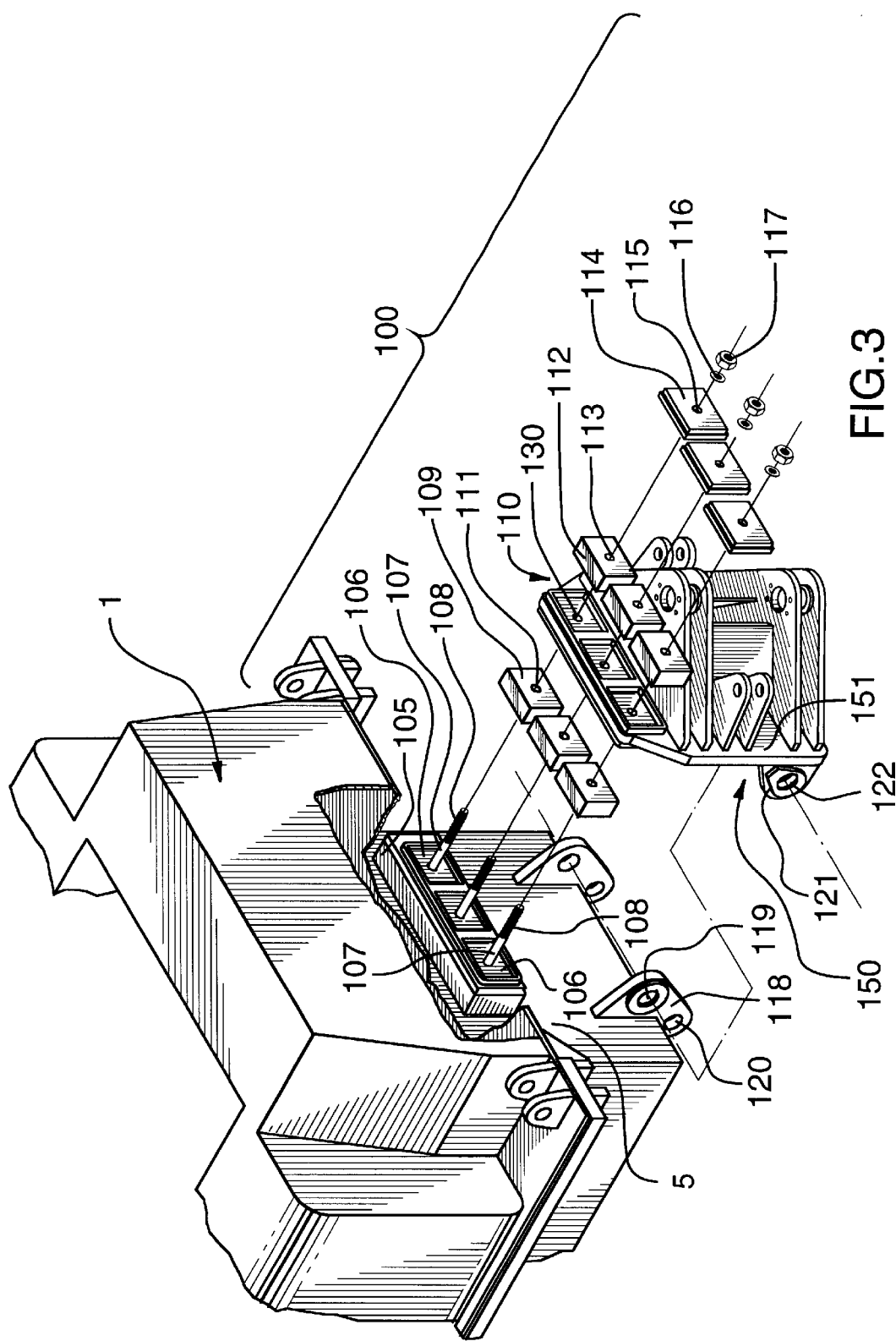
FIG. 3 is an exploded elevational side view of an isolation mount according to the invention.
Figure 4:
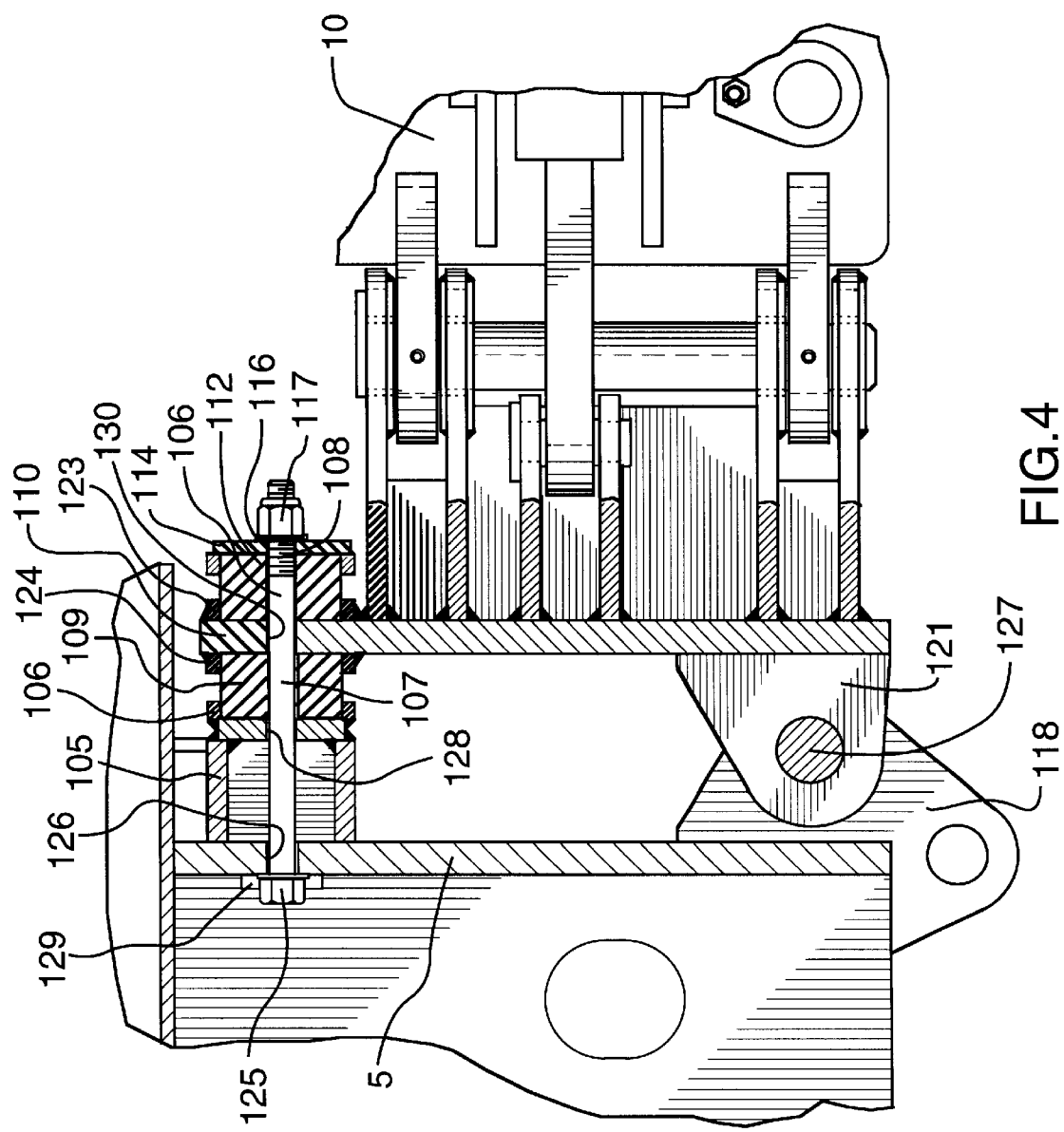
FIG. 4 is a sectional side view of an isolation mount according to the invention.
Figure 5:
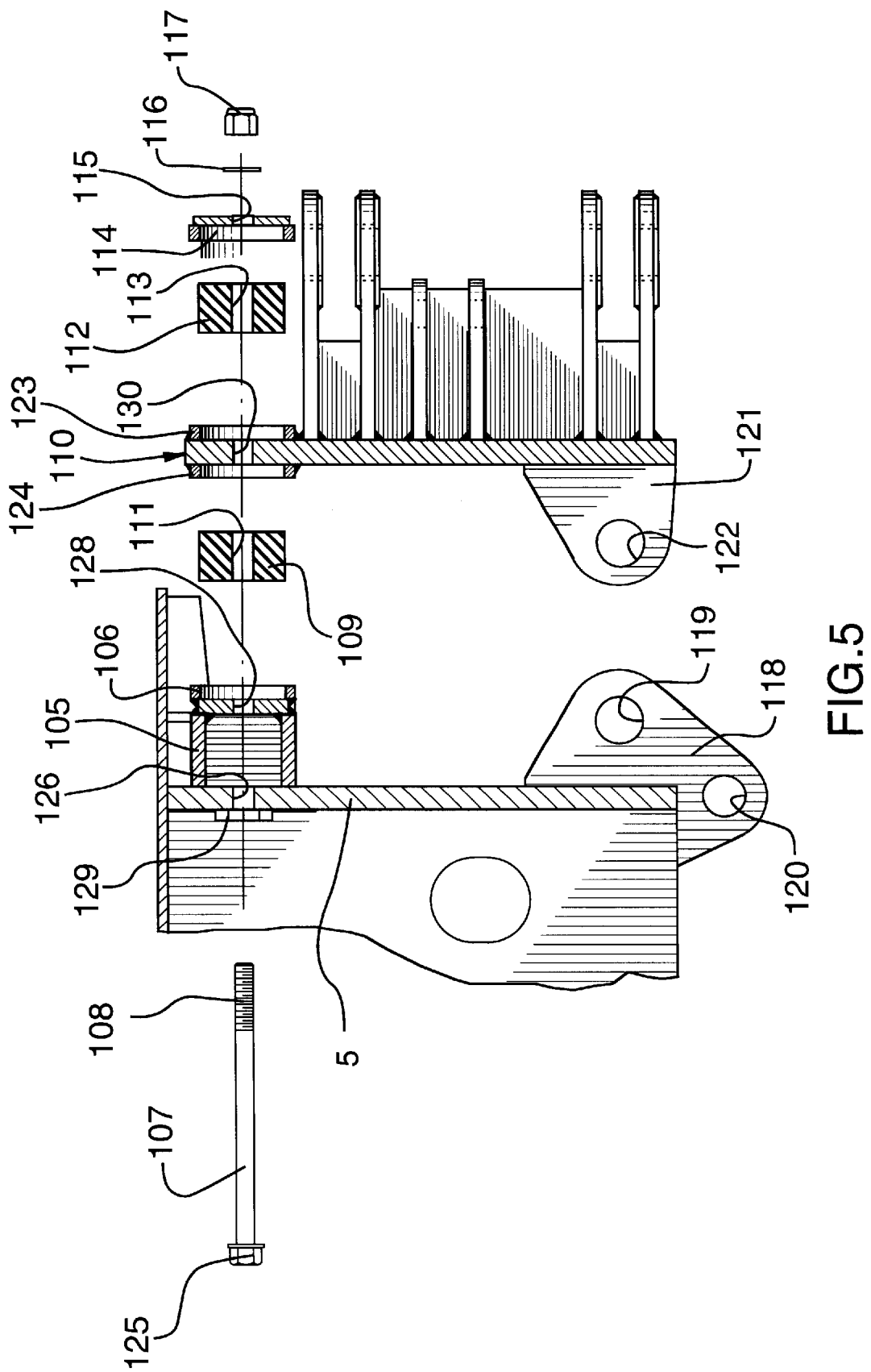
FIG. 5 is an exploded side view of an isolation mount according to the invention.
Figure 6:
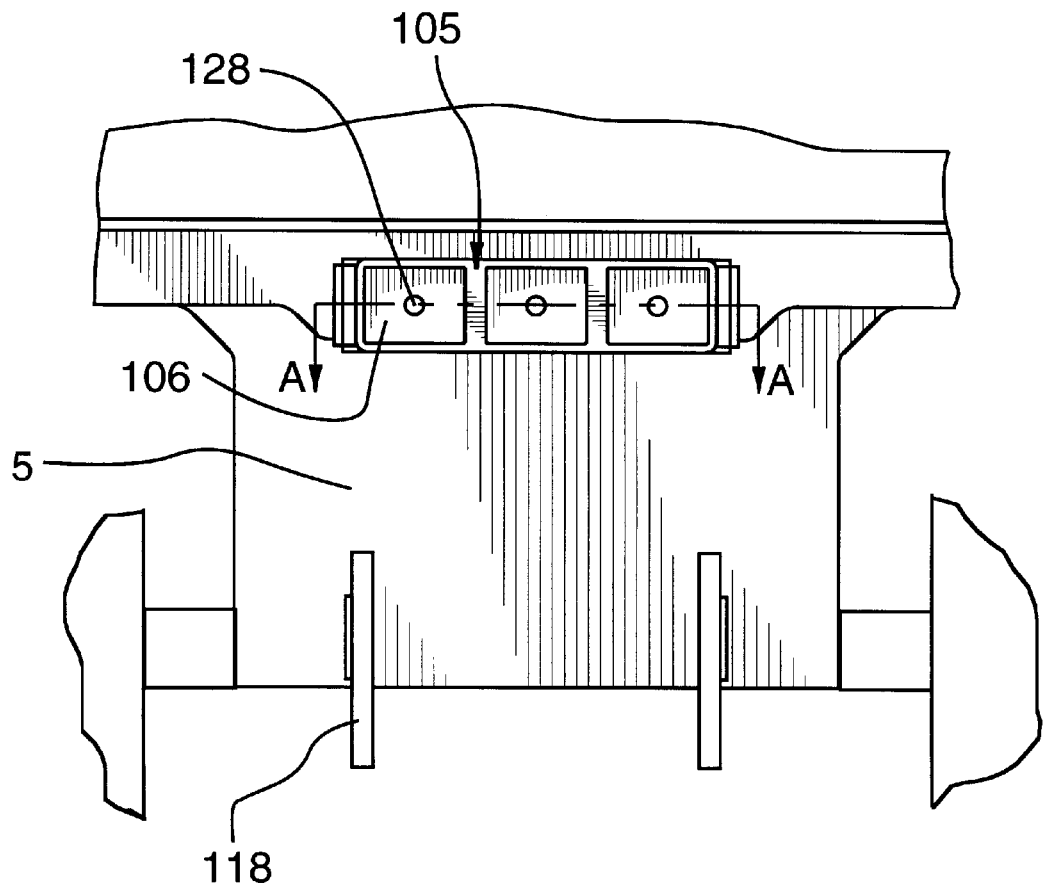
FIG. 6 is a view head on of the isolation mount parts of the tractor.
Figure 7:
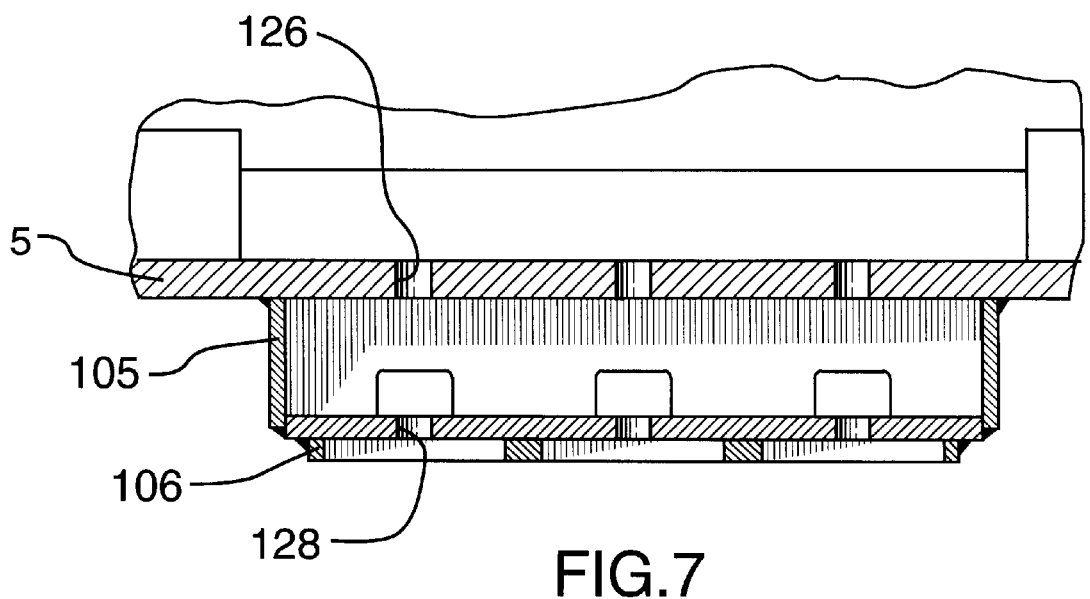
FIG. 7 is a sectional top view of the isolation mount parts of the tractor, along line AA of FIG. 6.

FIGS. 1 and 2 show a vehicle 1, for example a tractor, on which a tool 10 is mounted. The tool comprises a vibratory implement 20, such as a vibratory plow. The implement is mounted on a frame construction 30, which is mounted to the vehicle 1 via an isolation mount 100, for dampening vibrations from the implement to the vehicle.

As is shown in FIGS. 3 to 6, the isolation mount 100 comprises a first mounting surface 5 arranged on the vehicle 1. The first surface has substantially vertical first mounting lugs 118, with first mounting holes 119, the first mounting lugs being arranged at a lower end of the first surface, and at least one first fastening means 105 for holding at least one pair of resilient means comprising a first resilient means 109 and a second resilient means 112. The first fastening means is preferably arranged at a top end of the first surface 5, and preferably comprises first resilient means holders 106, bolts 107 having a head 125 and a threaded portion 108, second resilient means holders 114, washers 116 and nuts 117. Preferably, but not exclusively, the first surface is located at the rear of the vehicle. The first mounting lugs 118 may comprise additional mounting holes 120 for attaching further equipment to the vehicle 1.

The isolation mount 100 further comprises a pivoting means, preferably in the shape of a plate 110, having a first side 150 facing the first surface 5, a second side 151 facing away from the first surface and substantially vertical second mounting lugs 121, having second mounting holes 122, the second mounting lugs being arranged at a lower end of the first side of the plate. The second mounting lugs are attachable to the first mounting lugs 118 via pins 127 insertable into the first and second mounting holes 119, 122 (see FIG. 4) to form a first hinge for allowing the plate 110 to pivot about an axis perpendicular to the longitudinal axis of the vehicle. The plate further has third resilient holding means 124, arranged at the top of the plate on the first side 150, and fourth resilient holding means 123, arranged at the top of the plate on the second side 151. All resilient holding means 106, 114, 124, 123 has the function of acting as expansion limiting means for the resilient means, to prevent the resilient means from expanding excessively in a direction perpendicular to the direction of compression.

The first surface 5 has first bolt holes 126, to allow insertion of an individual bolt 107. The bolt head 125 is arranged on the side of the first surface 5 which faces the vehicle, and thus prevents the bolt from exiting the first bolt hole in a direction towards the isolation mount 100. The bolt head is accessible from the interior of the vehicle 1 to allow changing defective bolts 107. Furthermore, the first resilient means holders 106 of the first fastening means 105 have second bolt holes 128, to allow the bolts to pass through the first resilient means holders. Each first resilient means 109 has third bolt holes 111, and each second resilient means 112 has fourth bolt holes 113, to allow the respective resilient means to be mounted onto the bolts 107, each of the third and fourth bolt holes having a larger diameter than the bolt diameter. The plate 110 has fifth bolt holes 130 arranged through the third resilient holding means 124 and fourth resilient holding means 123, also to allow the bolts to pass through the respective resilient means holders. The second resilient means holders 114 have sixth bolt holes 115 to allow the bolts to pass through in a similar way.

Thus, to fasten the isolation mount 100 to the first surface of the vehicle 1, the bolts 107 are mounted through the first bolt holes 126 of the first surface and the second bolt holes 128 of the first fastening means 105, the first resilient means 109 are mounted onto the bolts and the plate 110 is mounted onto the first mounting lugs 118 and swung up so that the first resilient means are aligned and held by the first resilient holding means 106 and the third resilient holding means 124 and the bolts penetrate through the fifth bolt holes 130. Alternatively, the plate is mounted onto the first mounting lugs before the bolts are inserted into the first bolt holes. Thereafter, the second resilient means 112 are mounted onto the bolts 107, the second resilient means holders 114 are mounted onto the bolts, the washers 116 are mounted onto the bolts and, finally, the nuts 117 are threaded onto the threaded portion 108 of the bolts and tightened to provide the desired compression of the first and second resilient means. The second resilient means 112 are thus aligned and held by the second resilient means holder 114 and the fourth resilient means holder 123. To prevent the bolts 107 from rotating, and to allow tightening of the nuts 117 without having to manually hold the bolt heads 125, head clamping means 129 are preferably arranged on the side of the first surface on which the bolt head is located.

Figure 8:
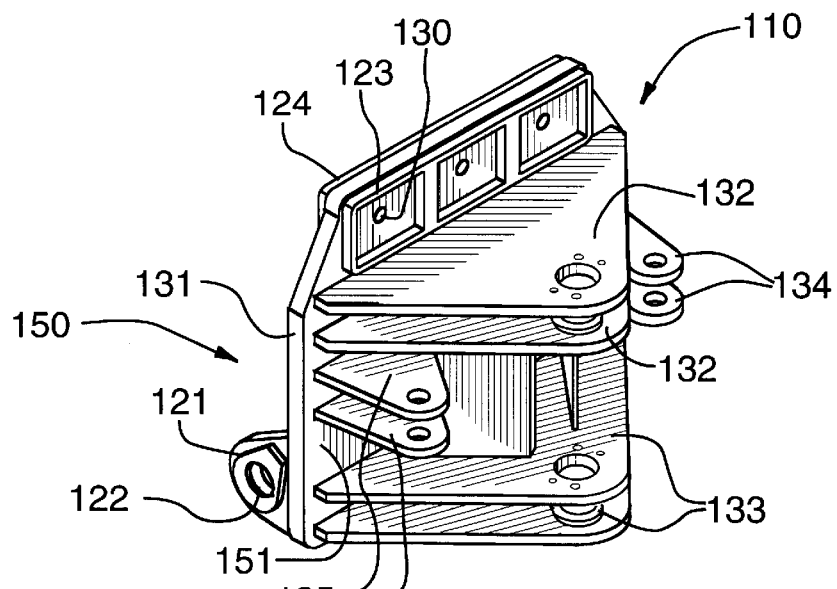
FIG. 8 is an elevational side view of the plate of the isolation mount according to the invention.
Figure 9:
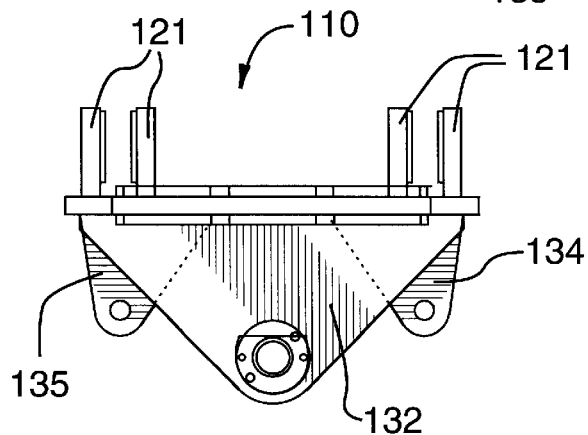
FIG. 9 is a top view of the plate according to FIG. 8.
Figure 10:
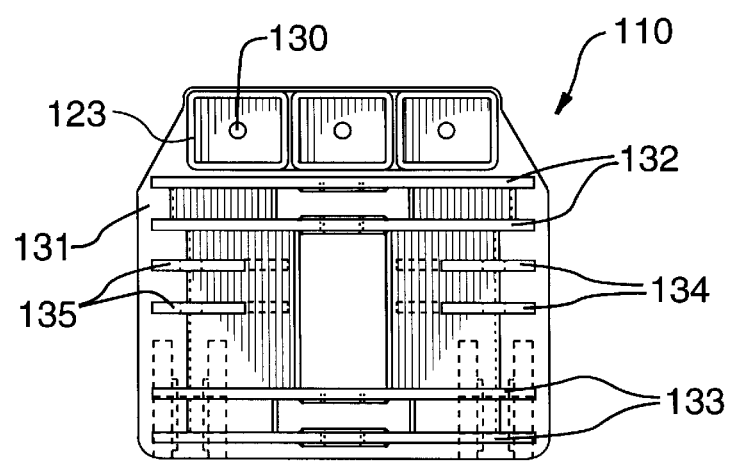
FIG. 10 is a face view of the plate according to FIG. 8, seen from the tool mounting side.

A preferred embodiment of the plate 110 is shown in FIGS. 8 to 10. The plate has a main body 131, which is substantially flat and onto which the second mounting lugs 121, having second mounting holes 122, are arranged as described earlier. Also the third resilient holding means 124, the fourth resilient holding means 123 and the fifth bolt holes 130 are as described earlier. To attach a tool (see FIGS. 1 and 2) to the plate 110 of the isolation mount, second fastening means are arranged on the second side 151 of the plate. The second fastening means preferably comprise upper tool mounting means 132 and lower tool mounting means are arranged spaced apart on the second side of the plate. Further mounting means, for example first hydraulic cylinder mounting means 134 and second hydraulic cylinder mounting means 135, are preferably also arranged on the second side of the plate.

Thus, the isolation mount 100 according to the invention provides a pivotable means 110, which may pivot in a direction parallel to the longitudinal direction of the vehicle. The first hinge takes up the large forces exerted upon the isolation mount, whilst the pivotable means is held by the first resilient means 109 and the second resilient means 112 to effectively absorb the vibrations which otherwise would have been transmitted from the tool to the vehicle. Tests have concluded that it is not necessary to provide the first hinge with resilient vibration dampers, the vibration dampening is more than adequate using the isolation mount as described according to the invention. The resilient means are readily accessible for possible replacement due to wear or changed conditions, and they last a long time, before being worn out, compared to resilient means used in prior art systems.

A preferred embodiment of a vibration isolation mount according to the invention comprises three pairs of resilient means and three fastening bolts with associated hardware, but other numbers of resilient pairs is also possible, for example four, five or six pairs depending upon the predicted load the isolation mount will be subjected to.

It is advantageous to arrange the resilient means adjacent the top of the pivoting means, because of the geometry of the tool construction. Thus, during use, i.e. when the vehicle is towing the tool and the tool is engaged in the ground, the direct load on the resilient means will be low with the biggest load taken up by the first hinge. Placing the load transfer low on the vehicle is also beneficial to the stability of the vehicle during operation of the tool. It is, however, conceivable to turn the described pivoting means upside-down, i.e. to have the first hinge adjacent the top of the pivoting means and the resilient means adjacent the bottom of the pivoting means.

It will be appreciated that the above description relates to the preferred embodiments by way of example only. Many variations on the invention will be obvious to those knowledgeable in the field, and such obvious variations are within the scope of the invention as described and claimed, whether or not expressly described.

What is claimed is:

1. A vibration isolation mount for dampening vibrations, said mount comprising:

a first mounting surface arranged on a vehicle, said first surface having substantially vertical first mounting lugs arranged at a lower end of said first surface, and a first fastening means for holding at least one pair of resilient means comprising first resilient means and second resilient means, said first fastening means being arranged at a top end of said first surface;

a pivoting means, having a first side facing said first surface, a second side facing away from said first surface and substantially vertical second mounting lugs arranged at a lower end of said first side of said pivoting means, said second mounting lugs attachable to said first mounting lugs via pins to form a first hinge, said pivoting means further having resilient means holding means arranged at a top end of said pivoting means;

said first resilient means being arranged between said first side of said pivoting means and said first mounting surface, and said second resilient means being arranged on said second side of said pivoting means and being pressed against said second side by fourth resilient means holding means, so that said pivoting means is held between said first resilient means and said second resilient means at said top end of said pivoting means, and said pivoting means being fastened to a vibrating tool attachably mounted to said pivoting means via second fastening means.

2. A vibration isolation mount according to claim 1, wherein said first fastening means comprise one bolt and nut per pair of said resilient means, which bolts cooperate with first bolt holes arranged in said first surface, second bolt holes arranged in said first fastening means, third bolt holes arranged in said first resilient means, fourth bolt holes arranged in said second resilient means, fifth bolt holes arranged in said pivoting means and sixth bolt holes arranged in said fourth resilient means holding means, so that said bolts are insertable from behind said first surface through said first bolt hole, with the bolt head preventing the bolt from going completely through said first bolt hole, through said second bolt hole of said first fastening means, through said third bolt holes of said first resilient means, through said fourth bolt holes of said second resilient means, through said fifth bolt holes of said pivoting means and through said sixth bolt holes of said fourth resilient means holding means, said nuts arranged to screw onto threads on said bolts to securely hold said first resilient means, said pivoting means, said second resilient means and said fourth resilient means holding means onto said bolts.

3. A vibration isolation mount according to claim 2, wherein said fastening means further comprises expansion limiting means arranged around said first and second resilient means, to physically limit the expansion of said pairs of resilient means during compression of said pairs of resilient means.

4. A vibration isolation mount according to claim 1, wherein said isolation mount comprises three pairs of resilient means, three bolts and three fourth resilient means holding means.

5. A vibration isolation mount according to claim 1, wherein said second fastening means comprise substantially horizontal third mounting lugs, which cooperate, via second pins, with substantially horizontal fourth mounting lugs arranged on the vibrating tool, to form second hinges.

6. A tractor having a vibratory plow arrangement held by a frame and a vibration isolation mount for dampening vibrations, said mount comprising:

a first mounting surface arranged on a vehicle, said first surface having substantially vertical first mounting lugs arranged at a lower end of said first surface, and a first fastening means for holding at least one pair of resilient means comprising first resilient means and second resilient means, said first fastening means being arranged at a top end of said first surface;

a pivoting means, having a first side facing said first surface, a second side facing away from said first surface and substantially vertical second mounting lugs arranged at a lower end of said first side of said pivoting means, said second mounting lugs attachable to said first mounting lugs via pins to form a first hinge, said pivoting means further having resilient means holding means arranged at a top end of said pivoting means;

said first resilient means being arranged between said first side of said pivoting means and said first mounting surface, and said second resilient means being arranged on said second side of said pivoting means and being pressed against said second side by fourth resilient means holding means, so that said pivoting means is held between said first resilient means and said second resilient means at said top end of said pivoting means, and said pivoting means being fastened to a vibrating tool attachably mounted to said pivoting means via second fastening means.

7. A tractor according to claim 6, wherein said first fastening means comprises one bolt and nut per pair of said resilient means, which bolts cooperate with first bolt holes arranged in said first surface, second bolt holes arranged in said first fastening means, third bolt holes arranged in said first resilient means, fourth bolt holes arranged in said second resilient means, fifth bolt holes arranged in said pivoting means and sixth bolt holes arranged in said fourth resilient means holding means, so that said bolts are insertable from behind said first surface through said first bolt hole, with the bolt head preventing the bolt from going completely through said first bolt hole, through said second bolt hole of said first fastening means, through said third bolt holes of said first resilient means, through said fourth bolt holes of said second resilient means, through said fifth bolt holes of said pivoting means and through said sixth bolt holes of said fourth resilient means holding means, said nuts arranged to screw onto threads on said bolts to securely hold said first resilient means, said pivoting means, said second resilient means and said fourth resilient means holding means onto said bolt.

8. A tractor according to claim 7, wherein said fastening means further comprises expansion limiting means arranged around said first and second resilient means, to physically limit the expansion of said pairs of resilient means during compression of said pairs of resilient means.

9. A tractor according to claim 6, wherein said isolation mount comprises three pairs of resilient means, three bolts and three fourth resilient means holding means.

10. A tractor according to claim 6, wherein said second fastening means comprises substantially horizontal third mounting lugs, which cooperate, via second pins, with substantially horizontal fourth mounting lugs arranged on the vibrating tool, to form a second hinge.

* * * * *